Nov. 21, 1944.   P. MacGAHAN   2,363,345
DETACHABLE INSTRUMENT
Filed April 1, 1942   2 Sheets-Sheet 1
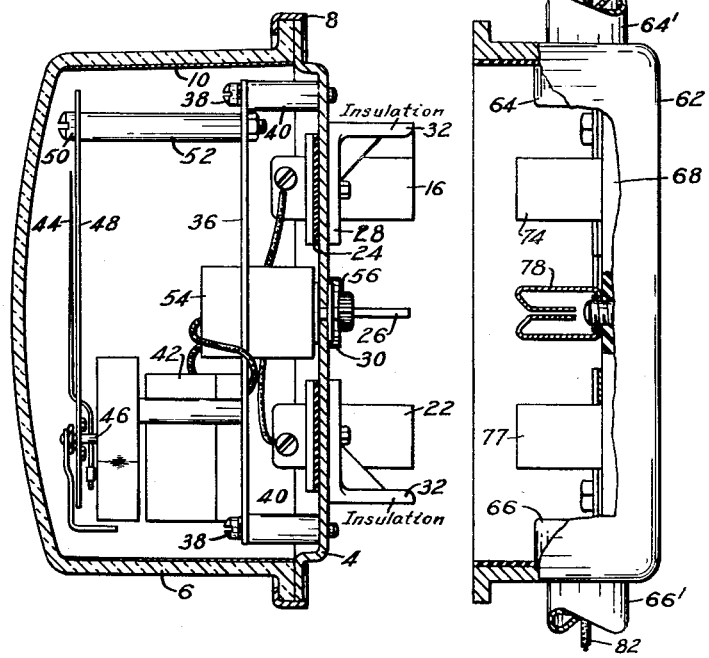
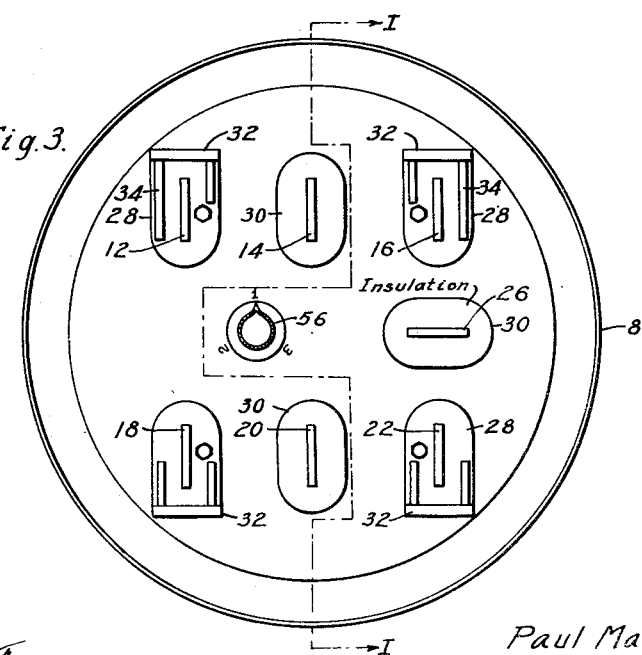
WITNESSES:
INVENTOR
Paul MacGahan.
ATTORNEY Nov. 21, 1944.  P. MacGAHAN  2,363,345
DETACHABLE INSTRUMENT
Filed April 1, 1942  2 Sheets-Sheet 2

WITNESSES:  INVENTOR
  Paul MacGahan.
  BY
  ATTORNEY

Patented Nov. 21, 1944

2,363,345

UNITED STATES PATENT OFFICE 2,363,345

DETACHABLE INSTRUMENT

Paul MacGahan, Orange, N. J., assignor to Westinghouse Electric & Manufacturing Company, East Pittsburgh, Pa., a corporation of Pennsylvania Application April 1, 1942, Serial No. 437,245

3 Claims. (Cl. 171—34)

The present invention relates to measuring instruments and it has particular relation to such instruments of the so-called detachable type in which the mounting of the instrument upon its supporting base or socket automatically makes the desired electrical connection to the circuit undergoing measurement.

Detachable meters and instruments, which are shown by way of example in U. S. Patent 1,969,-499, issued August 7, 1934, to Bradshaw et al., and U. S. Patent 2,128,277, issued August 30, 1938, to Young et al., have met with considerable commercial success. These devices comprise, in general, an encased measuring element with contact blades projecting from the base of the casing for cooperation with contact jaws mounted in a detachable type receptacle or socket and connected to the circuit to be metered.

While installations of the type adapted to be metered by detachable equipment are widely used because of their many advantages, maximum benefits could not heretofore be derived from them because of the necessity that the contact jaws be arranged in various different patterns in different sockets in order to accommodate the various types of electric service used. Thus, the pattern in which contact jaws are arranged in a receptacle accommodating a three-phase, three-wire system is entirely different from the contact pattern required in receptacles for three-phase, four-wire systems or for two-phase, four-wire systems. As an example, a detachable instrument having contact blades arranged to engage the proper contact jaws of a socket used with one of these systems to measure the voltage of the system cannot be employed with either of the other systems. At least three different detachable voltmeters each having a different terminal or contact blade pattern have thus become standard equipment in the art to accommodate these different situations.

According to the present invention, however, an electrical measuring instrument of the detachable type is provided with a switch for connecting its operating mechanism or movement to selected terminal blades projecting from its base. The measuring device, which may be a watthour meter, voltmeter, ammeter or the like, as desired, is provided with a plurality of such contact blades so that some of them will engage the proper contact jaws in each of a plurality of different type receptacles. By means of the switch, it is thus possible to connect the instrument movement to the proper contacts for the particular type of receptacle or socket in which a measurement is to be made.

It is accordingly an object of the present invention to provide a novel and improved electrical measuring device of the detachable type.

A further object of the invention is to provide a detachable type measuring instrument embodying a switch for selectively adapting it to measure an electrical quantity across contacts arranged in different patterns in detachable type receptacles or sockets.

Other objects and advantages of the invention will appear from the following detailed description read in connection with the accompanying drawings, in which:

Figure 1 is a side view of an instrument embodying the present invention with parts thereof shown in vertical section along the line I—I of Fig. 3.

Fig. 2 is a side elevational view with parts broken away of a detachable type socket or receptacle designed to accommodate the instrument of Fig. 1;

Fig. 3 is a rear elevational view of the instrument of Fig. 1;

Figure 4:
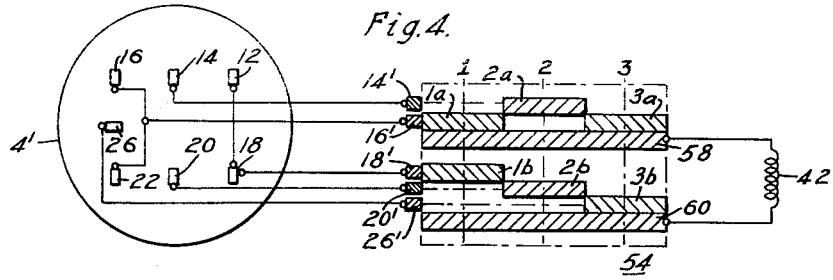
Fig. 4 is a schematic wiring diagram of the instrument of Fig. 1 including a development of the switch shown therein.

By way of example, a voltmeter has been selected as the instrument for illustrating the invention. Referring particularly to Figs. 1 and 2, it includes a casing comprising a metallic base plate 4 and a transparent glass cover 6 which is secured thereto by a clamping ring 8 of a usual type such as that described in United States Patent No. 1,969,499, to Bradshaw et al. In order to improve the appearance of the instrument and facilitate reading it, a coating 10 of material impervious to light is disposed upon the side wall portion of the cover 6.

Contact blades designated as 12, 14, 16, 18, 20 and 22 project from the rear of the base 4 in vertically spaced rows of three as shown best in Fig. 3. Washers 24 are disposed about each of these contact blades to insulate them from the base 4 in a usual manner, while an additional blade 26 similarly extends through the base at a point intermediate the two end terminals 16 and 22. Washers 28 of insulating material are disposed about the corner contacts on the outside of the base while washers 30 of a somewhat different shape are similarly disposed with reference to the remaining contact blades 14, 20 and 26. Each of the insulating washers 28 includes an outwardly projecting baffle portion 32 which is provided to prevent accidental electrical contact between the contact blades and the receptacle or socket when the instrument is being mounted in position. The washers 28 adjacent the two outer contact blades of the upper row also include outwardly vertical baffles 34 for a purpose which will be explained more fully hereinafter.

An auxiliary base plate 36 is secured to the plate 4 by means of machine screws 38 extending through bushings or spacing posts 40 and an instrument movement including a winding 42 is secured to these base plates in any suitable manner.

The instrument movement shown by way of example is of the repulsion vane type designed to measure voltage, and the winding 42 encloses a chamber in which the moving and stationary vanes are disposed. The moving vane operates a pointer 44 through a shaft 46. The specific construction of the instrument movement is not of importance with respect to the present invention, it being contemplated that any well known instrument movement may be substituted for the one shown in the drawings.

An indicating dial plate 48 is disposed in front of the instrument movement by means of machine screws 50 and spacing posts 52. A usual type scale (not shown) may be printed on the plate 48 for cooperation with the pointer 44.

A switch 54 is disposed within the casing from the base plate 4 in any suitable manner so that an operating knob 56 is accessible from the outside thereof. This switch is electrically connected to the instrument winding 42 and to the various blades and may be of any suitable construction.

By way of example, the switch is shown in Fig. 4 as being of the drum type having positions designated as 1, 2 and 3. In this figure, 4' represents the base plate 4 viewed from the inside and the contact blades are represented by the same numerals as in Fig. 3. The winding 42 is shown connected across continuous conducting segments 58 and 60 while contact blades 14, 16, 18, 20 and 26 are connected to stationary contacts designated by corresponding primed numbers. The switch drum includes conducting segments 1a, 2a and 3a electrically connected to continuous segment 58 and segments 1b, 2b and 3b electrically connected to continuous segment 60. In addition, contact blades 12 and 18 and 16 and 22 are interconnected. This design is such that when the stationary contacts engage the drum at position 1, the contact blade 16 is connected to the continuous contact 58 while the interconnected terminal blades 12 and 18 are connected to the continuous conducting segments 60 so that the winding 42 is connected between contact blades 12 and 16. In a similar manner, the instrument winding is connected across contact blades 14 and 20 while the switch is in position 2 and across blades 16 and 26 while in position 3.

Figure 5:
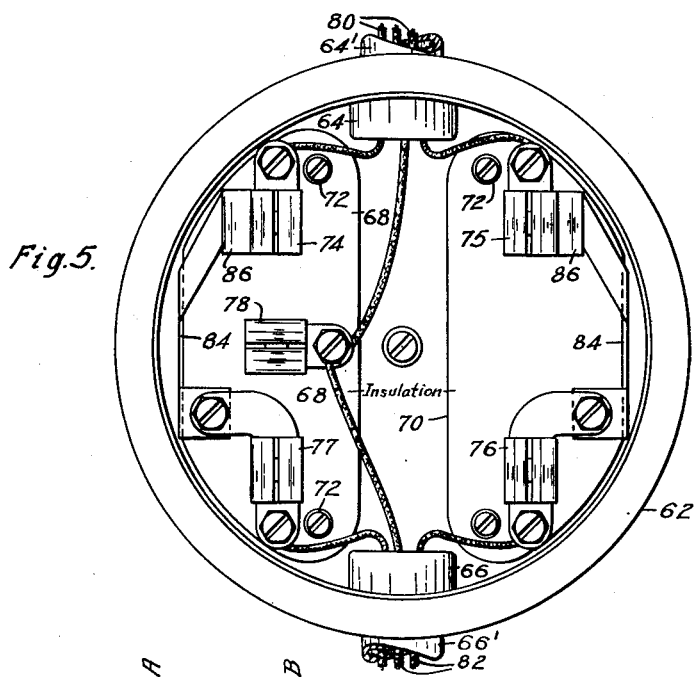
Fig. 5 is a front elevational view of the socket of Fig. 2.

Figs. 2 and 5 illustrate a detachable type receptacle or socket which is adapted for accommodating a three-phase, three-wire load. The receptacle comprises, generally, a base 62 which may be of cast metal or the like and is adapted to receive conduits in diametrically opposed positions at 64 and 66. Thus in Fig. 5, conduits 64' and 66' are shown extending into the openings at these positions.

A pair of insulating blocks 68 and 70 are secured to the back of the casing by machine screws designated at 72 and these blocks, in turn, support contact jaws in insulated relationship to the receptacle itself. These contact jaws are designated in Fig. 5 as 74, 75, 76, 77 and 78, and are disposed in the usual pattern for a three-phase, three-wire installation. The spacing of these jaws is such that they are engaged by contact blades 16, 12, 18, 22 and 26, respectively, when the instrument is disposed upon the receptacle in the usual manner.

In addition, incoming conductors 80 of a three-phase, three-wire system are brought into the receptacle through the conduit 64' and connected to the contact jaws in the usual manner. The load conductors 82 are likewise connected in their proper positions which are well known to those skilled in the art.

In order to prevent breaking the circuits of the outer wires of the system when no meter or instrument is in place on the socket, contact strips 84 are connected to the jaws 77 and 78 and extend to auxiliary contact jaws 86 adjacent to the contact jaws 74 and 75. This construction may be of the type described in Mylius Patent No. 2,088,480, in which the auxiliary jaws 86 normally engage the adjacent main contact jaws 74 and 75 to connect them to lower jaws 77 and 76, respectfully. They are designed, however, so that the baffle 34 of the washers 28 on the instrument are extended therebetween to electrically insulate them when the instrument is in operating position. It will appear that this particular feature need not be employed in the apparatus where momentary interruptions of current in the circuit being tested will cause no harm.

When the instrument, which is shown by way of example as being a voltmeter, is to be placed in operating position upon the socket 62, the switch 54 will be turned to position 1 so that the winding 42 is connected between contact blades 12 and 16. In this manner the value of the voltage between the contact jaws 74 and 75 will be indicated on the instrument.

Figure 6:
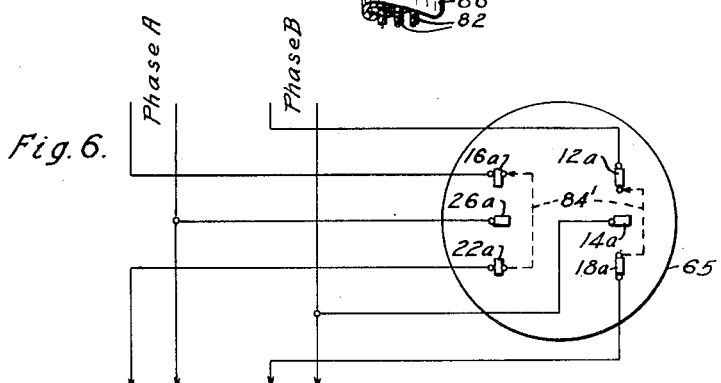
Fig. 6 is a schematic wiring diagram of a different type of detachable socket installation with which the instrument of Figs. 1, 3 and 4 may be used.

In Fig. 6, the connections of a detachable socket or receptacle 65, for use with a two-phase four-wire system is shown schematically to illustrate another installation with which the present instrument may be employed. The contact jaw pattern shown in this socket is well known to those skilled in the art. These jaws are designated by the number of the instrument blade which will fit therein followed by the letter a. In this case, the voltage measurement can be obtained by connecting the instrument movement across the contact jaws 16a and 26a in order to adjust the instrument so that this connection is made when it is placed upon the receptacle. To accomplish this, the switch of Fig. 4 is adjusted to position 3 wherein coil 42 is connected between the terminal blades 16 and 26. At 84' in Fig. 6 are represented the interconnecting strips shown at 84 of Fig. 5 and previously discussed with reference to that figure.

When the switch 54 is adjusted to position number 2, the winding 42 is connected directly between the terminals 14 and 20. As will appear to those skilled in the art, this is the connection desired to measure the voltage in a usual three-phase four-wire detachable metering system.

It will appear from the above that a single detachable type instrument may thus be designed so as to be readily adapted to measure an electrical quantity across any of a plurality of types of detachable receptacles having different contact jaw patterns. This makes it unnecessary to have a plurality of different instruments to accommodate such different circuits and results in important advantages with regard to economy and convenience. It will also appear that the invention is not limited to a voltmeter such as is described by way of example. In addition, the instrument may be designed for measuring from sockets having entirely different contact jaw patterns than those described where the need arises.

Since modifications along these and similar lines will appear to those skilled in the art, it is intended that the invention shall be limited only by the spirit and scope of the appended claims.

I claim as my invention:

1. In a detachable type electrical instrument including a casing having a plurality of contact blades projecting from the base thereof for mounting on any one of a plurality of sockets each socket having contact jaws mounted therein disposed in a different pattern in each socket depending upon the type of external circuit with which the socket is to be connected and positioned to receive certain of the contact blades of the instrument casing, an instrument movement including a winding mounted in said casing, a selector switch mounted in said casing, and electrical connections between said switch, contact blades and winding for selectively connecting said winding between desired pairs of jaws in accordance with the connections of said jaws in' said external circuits.

2. In a detachable type electrical instrument including a casing having a plurality of contact blades projecting from the base thereof for mounting on any one of a plurality of sockets each socket having contact jaws mounted therein disposed in a different pattern in each socket depending upon the type of external circuit with which the socket is to be connected and positioned to receive certain of the contact blades of the instrument casing, an instrument movement including a winding mounted in said casing, a selector switch mounted in said casing, and electrical connections between said switch, contact blades and winding for selectively connecting said winding between desired pairs of blades in accordance with the connections of said jaws in said external circuits, said switch having an operating means accessible from outside said instrument casing before the casing is mounted on a socket.

3. An electrical instrument including a winding, a casing for said winding having a plurality of contact blades projecting from the base thereof, a selector switch for connecting said winding across desired pairs of said contact blades, a plurality of socket mountings for said instrument, each socket having contact jaws mounted therein disposed in a different pattern in each socket depending upon the type of external circuit with which the socket is to be connected and positioned to receive certain of the contact blades of the instrument casing, said selector switch being operable from outside the instrument casing before it is mounted on a socket to connect said winding between the blades in engagement with the jaws receiving them.

PAUL MacGAHAN.